May 10, 1938.　　G. F. MILLER ET AL　　2,116,907
SPRING ASSEMBLY MEANS
Filed Oct. 2, 1936　　2 Sheets-Sheet 1
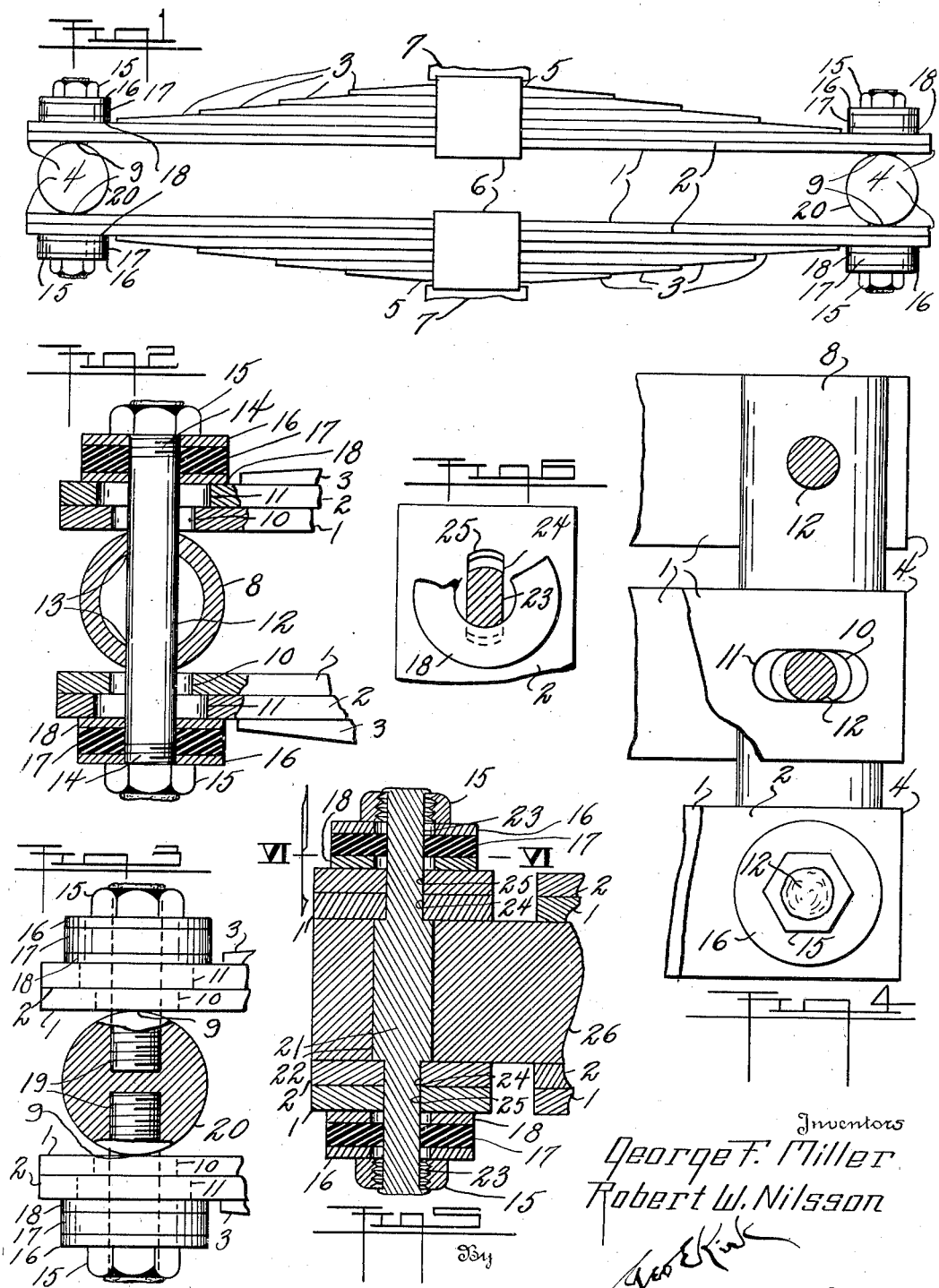
Inventors
George F. Miller
Robert W. Nilsson

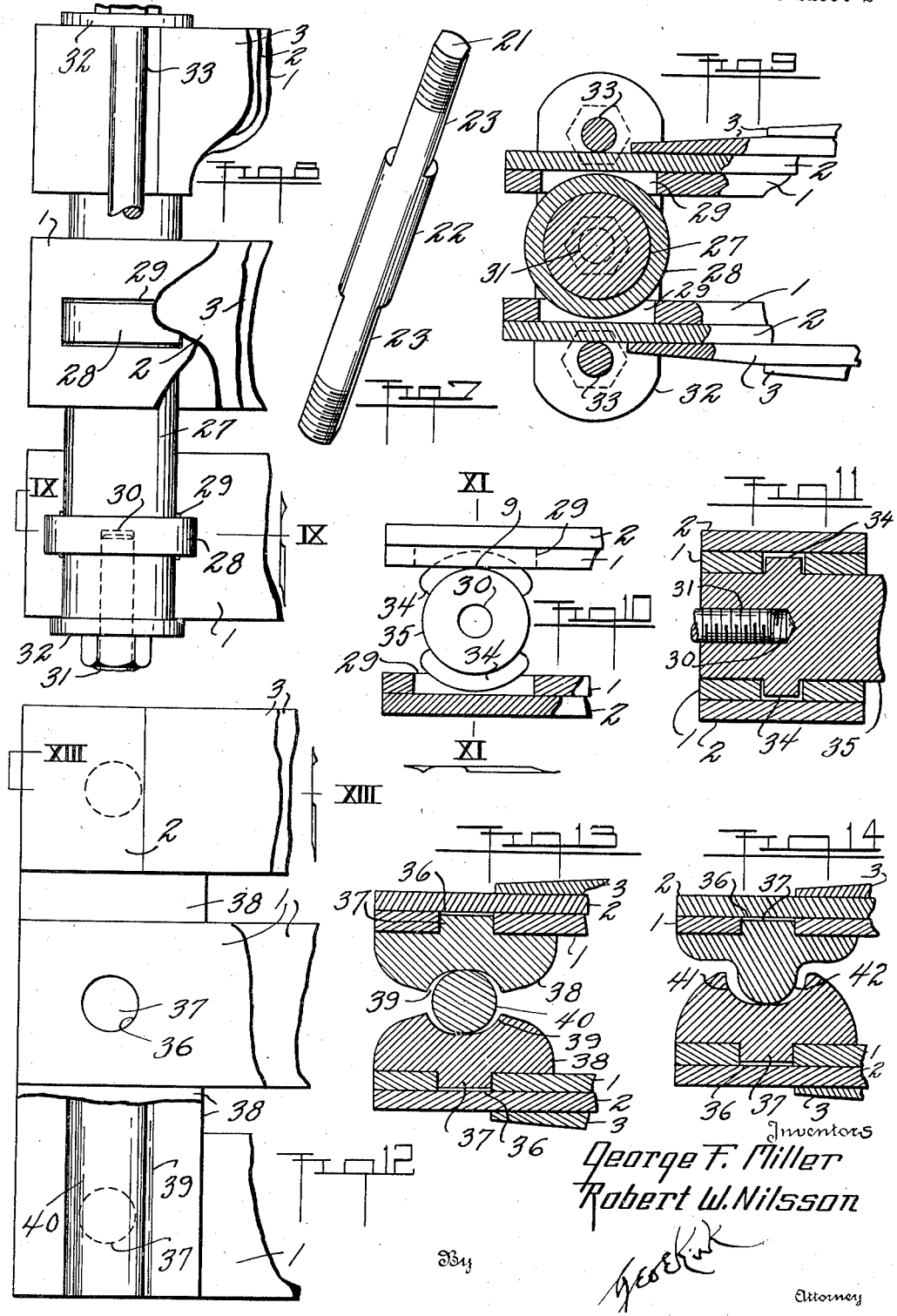

Patented May 10, 1938

2,116,907

UNITED STATES PATENT OFFICE 2,116,907

SPRING ASSEMBLY MEANS

George F. Miller and Robert W. Nilsson, Toledo, Ohio, assignors to The Mather Spring Company, Toledo, Ohio, a corporation of Ohio Application October 2, 1936, Serial No. 103,836

3 Claims. (Cl. 267—55)

This invention relates to leaf spring features, more particularly as to load transmitting mounting of an end or ends thereof.

This invention has utility when incorporated in full elliptical and fractional elliptical springs, especially in vehicle practices as may be desirably located between the wheel axles and the chassis or body, as automotive vehicles, railway cars, locomotives and analogous equipment.

Referring to the drawings:

Fig. 1 is a side elevation of an embodiment of the invention in a full elliptic spring in loaded or unarched position;

Fig. 2 is a fragmentary view of an end mounting for spring leaves, as of the pair of springs of Fig. 1 and suitable for such multiple grouping as may be desired;

Fig. 3 is a fragmentary view similar to Fig. 2, wherein there is departure in details of the assembly for the intermediate roller or rocker;

Fig. 4 is a fragmentary view partially in plan, with the spring ends in the assembly of Fig. 1;

Fig. 5 is a detail sectional view longitudinally of the roller and bolt, wherein the bolt or stem is keyed against rotation relatively to the spring leaves;

Fig. 6 is a section on the line VI—VI, Fig. 5;

Fig. 7 is a perspective view of the bolt in the assembly of Fig. 5;

Fig. 8 is a fragmentary view of a leaf spring free end assembly, wherein the rocker is provided with enlargements instead of tie pins or bolts as in Fig. 1;

Fig. 9 is a section on the line IX—IX, Fig. 8;

Fig. 10 is a fragmentary detail view wherein the enlargements for the rocker assembly are between the free ends of the spring leaves and discontinuous;

Fig. 11 is a section on the line XI—XI, Fig. 10;

Fig. 12 is a fragmentary plan view of leaf spring end assembly, wherein the rocker seats are positioned with the leaves and there is an intermediate rocker;

Fig. 13 is a section on the line XIII—XIII, Fig. 12; and

Fig. 14 is a view similar to Fig. 13, wherein the rocker opposing the seat is fixed with its spring ends instead of involving an intermediate rocker member as in Fig. 13.

The spring of this disclosure embodies major spring leaves 1, 2, and minor spring leaves 3, receding from terminus 4 to major thickness portion 5, wherein there is assembly fitting 6 in practice usually providing a socket 7 through receiving which load this holding means 7 of the socket effects spring flexing. This socket 7 may receive a load. Load transmitting action is effected adjacent the free ends 4 of the major spring leaves 1, 2. Springs of this type, in practice, involve yieldable holding of considerable mass or weight under wide ranges of operating conditions or concussion. The action from the load-receiving portions 7 in flexing, say from arched position toward straight position effects change in the distance between the load-receiving portions 7 and the transmitting portion adjacent the free ends 4.

Grip holding therebetween introduces additional problems of strength taxing for the spring assembly. It is the purpose hereunder to retain the full strength of the spring as a spring with full freedom to act as the spring independently of detracting therefrom by resistance, say such as would oppose the change of distance between the line of action from the load and the line of action of transmission approximately parallel to such load. To such end, there is herein provision of a rocking or fractional rolling spacer or assembly for the free ends 4.

Instead of a link, shackle or eye, there is assembled between the ends 4 cylinder member 8 of tubular form having therein line bearing contacts 9 with the opposing faces of the spring leaves 1. The axis of this member is spaced from the free ends of the spring leaves and is accordingly laterally of the spring leaves and extends transversely of and adjacent to the spring leaves. This cylinder 8 is located with a limited freedom of movement fully to respond to the spring action but effectively held against escape from between the leaves 1.

To this end, oval slots, openings or recesses 10, 11, in the leaves 1, 2, are normally concentric with bolt or stem 12, more or less having tight or loose fit at openings 13 with the tube 8. This bolt 12 projects beyond the leaves 2 and at its terminal threaded portions 14 has nuts 15 against washers 16 holding compressible washers 17 against washer 18 at the springs 2. These compressible washers 17 insure holding against rattle and provide a yieldable take-up at all variations of movement between the leaves 1, 2, as adjacent for one or two in either assembly with one or two of the other assembly, whether opposing or lateral. The line contacts 9 permit the slight rocking or tilting of the bolt 12 in caring for the changes in load conditions for which the spring is designed to be effective. In the assembly herein, the rockable bearing-providing member or cylinder 8 is effectively anchored against shifting transversely by the angle means or stud bolt 12 in its coaction with the adjacent slots 10, 11, of the spring leaves. In practice these springs, say in railway cars, trucks, etc., may be grouped in two or more for a unit. Such unit as assembled at the seats 7 is in working position. In the event of a desired replacement, the seats 7 are released and the entire spring multiple grouping is thus readily removed as a unit.

Instead of adopting the continuous stud 12 through from the leaves 1, 2, of one spring to the other, discontinuous bolt means 19 (Fig. 3) may be adopted and such anchored in solid rocker or roller 20 instead of the tube 8. This roller 20 still preserves line contacts 9 with the spring leaves 1 due to the threaded assembly of these bolts 19 with the rocker 20. There is positive locking in positioning the member 20 with the respective spring leaves.

A variant from the locking means of Figs. 2, 3, may be had with bolt 21 (Figs. 5, 6, 7). This bolt 21 has cylindrical intermediate portion 22 and flattened portions 23 therefrom protruding through the leaves 1 at flat sided slots 24, 25, thereby holding this bolt against rotation relatively to the leaves. The slots 24, 25, allow for the come and go relatively to the free ends 7, while the cylindrical portion 22 as fitting with the roller 26 still retains the rocking bearing coaction between the free ends of the spring leaves. Compressible packing washers 17 between the washers 16, 18, are held by nuts 15 in this assembly against lost motion or play.

Rocker cylinder 27 (Fig. 9) has press-anchored therewith or shrunk thereon collars 28 extending into slots 29 of spring leaves 1, thereby serving as a key for the rocker bearing 27 in its rocking or line coaction with the spring leaves 1 on opposite sides of the slots 29. In this assembly, supplemental provision is taken against binding or lateral shifting between the collars 28 and the free ends of the spring leaves. The roller 27 has end taps 30 engaged by bolts 31 mounting end plates 32. The opposite end plates 32 are tied across by bolts 33. This is a supplemental reinforcement for maintaining the gang or group of the springs in a unit as an aligned assembly.

In lieu of the enlargements or collars 28 as annularly continuous, projecting lugs or arc portions 34 (Fig. 10) are on central rocker bearing or cylinder 35. These projecting portions 34 extend into the slots 29 of the spring leaves 1. The anchoring here is accordingly analogous to that in the anchoring of the cylinder 27. Likewise, there are the tapped ends 30 for the bolts 31 as holding end plates 32 for engagement by the assembly bolts 33 effectively locking the spring leaves against jumping away from the assembly.

In this same lateral assembly between the plates 32 as assembled by the bolts 33, the spring leaves 1, instead of having slots or ports 29, may have dowel openings or ports 36 (Fig. 13) to receive lugs 37 of assembly bars 38, having seats 39 in opposing relation, thereby to provide nesting means for intermediate roller 40, which may be held against axial shifting by terminal plates, bolt attached; welded or even integral shoulder enlargements.

Instead of similar opposing bars 38, there may be provided groove or channel-providing seat 41 (Fig. 14) for opposing rib or projected seat 42. The weave or warp of the spring free ends in these approximately-aligned contact coactions in the various disclosures minimizes frictional resistance and permits the spring to adapt itself readily to the configuration most effective for response to variations in road conditions, not only under such conditions as deflection but in return to normal therefrom.

What is claimed and it is desired to secure by Letters Patent is:

1. An end connection for a full elliptical spring embodying spring leaves having recesses spaced from the free ends thereof, said connection comprising a cylindrical member having its axis of rocking between and spaced from the spring leaves for independent dissimilar movement of said leaves, and means engaging the cylindrical member and having limited movement relative to the spring within the said recesses.

2. An end connection for a full elliptical spring embodying spring leaves having recesses spaced from the free ends thereof, said connection comprising a cylindrical member having its axis of rocking between and spaced from the spring leaves for independent dissimilar movement of said leaves, stem means engaging the cylindrical member and having extent of movement of the connection relative to the spring limited by the recesses, and yieldable assembly means for anchoring the stem means with the spring leaves.

3. An end connection for an elliptical spring flat leaf recessed terminal portion, a rockable bearing-providing cylindrical member disposed for rolling action as to the flat leaf of the spring, said member having holding means protruding into the recess, and a connector between the leaf and member fixed with one thereof and movable as to the other in a range of said rocking.

GEORGE F. MILLER.
ROBERT W. NILSSON.